United States Patent [19]
Bedard et al.

[11] Patent Number: 5,518,707
[45] Date of Patent: May 21, 1996

[54] METALLO GERMANATES

[75] Inventors: Robert L. Bedard, McHenry; Lisa M. King, Crystal Lake, both of Ill.

[73] Assignee: UOP, Des Plaines, Ill.

[21] Appl. No.: 411,187

[22] Filed: Mar. 27, 1995

Related U.S. Application Data

[63] Continuation-in-part of Ser. No. 327,947, Oct. 24, 1994, abandoned.

[51] Int. Cl.$^6$ .................................................. C01B 37/00
[52] U.S. Cl. ........................ 423/700; 423/713; 423/92; 423/93; 423/618
[58] Field of Search ........................ 423/700, 713, 423/718, 92, 93, 618

[56] References Cited

U.S. PATENT DOCUMENTS

| | | | |
|---|---|---|---|
| 3,329,481 | 7/1967 | Young | 423/333 |
| 3,622,268 | 11/1971 | Wada et al. | 423/24 |
| 4,061,724 | 12/1977 | Grose et al. | 423/705 |
| 4,208,305 | 6/1980 | Kouwenhoven et al. | 423/713 |
| 4,310,440 | 1/1982 | Wilson et al. | 502/208 |
| 4,440,871 | 4/1984 | Lok et al. | 502/214 |
| 4,500,651 | 2/1985 | Lok et al. | 502/208 |
| 4,992,250 | 2/1991 | Flanigan et al. | 423/713 |
| 5,015,453 | 5/1991 | Chapman | 423/713 |

OTHER PUBLICATIONS

Wittmann et al. "Uber Zeolithische Germanate Mit Einwertiuen Kation" *Monatschefte for Chemie* vol. 87 1956 pp. 655–661.

Nenoff et al. "Na$_3$ H$_x$(H$_2$PO$_4$)$_x$ [(GeO)$_4$(GeO$_4$)$_3$]. 4H$_2$O: A Rhombohedrally Distorted Germanium Phamacosiderite Analog w/Anion/Cation Exchange Capabilities" *Chem. Mater.* Apr. 1994 vol. 6 p. 525.5.

Nowotny et al. "Zeolithische Alkaligermanate" *Monatshefte Für Chemie* vol. 85 1954 pp. 558–574.

Nowotny et al. "Alkaligermanate Von Typ M H$_3$(TezO$_6$" *Monatshefte Für Chemie*, vol. 84 pp. 701–704 1953.

Acta Cryst., 12, 252 (1959) (no month).
J. Chem. Soc. Chem Commun., 1566 (1987) (No month).
Zeolites, 10, 730–737 (1990) (Nov./Dec.).
Chem. Mater., 4 468–72 (1992) (no month).

*Primary Examiner*—Mark L. Bell
*Assistant Examiner*—David Sample
*Attorney, Agent, or Firm*—Thomas K. McBride; Eugene I. Snyder; Frank S. Molinaro

[57] ABSTRACT

This invention relates to novel crystalline molecular sieves having the pharmacosiderite structure and having germanium and M metals as framework elements. Optionally, titanium and silicon can also be a framework element. The M metals can be any metal which has octahedral coordination and has a valence of +2, +3, +4 or +5. Illustrative of these M metals are niobium, tin, antimony, aluminum, gallium and tantalum.

11 Claims, No Drawings

METALLO GERMANATES

CROSS REFERENCE TO RELATED APPLICATION

This application is a continuation-in-part of prior application U.S. Ser. No. 08/327,947 filed on Oct. 24, 1994, now abandoned.

FIELD OF INVENTION

The instant invention relates to novel crystalline molecular sieves having the pharmacosiderite structure. The composition has a three dimensional framework made up of at least germanium and at least one M framework element where M is a metal such as niobium, gallium and tin and optionally titanium and silicon.

BACKGROUND OF THE INVENTION

Molecular sieves have been well known for many years. The first known molecular sieves were crystalline aluminosilicates and were named zeolites. Both naturally occurring and synthetic zeolites now number over 150 species. In general, the crystalline zeolites are formed from corner-sharing $AlO_2$ and $SiO_2$ tetrahedra and are characterized by having pore openings of uniform dimensions, having a significant ion-exchange capacity and being capable of reversibly desorbing an adsorbed phase which is dispersed throughout the internal voids of the crystal without significantly displacing any atoms which make up the permanent crystal structure.

Other crystalline microporous compositions are known which are not zeolitic but which exhibit the ion-exchange and/or adsorption characteristics of the zeolites. These include: 1) a pure silica polymorph, silicalite, having a neutral framework containing neither cations nor cation sites as disclosed in the U.S. Pat. No. 4,061,724; 2) crystalline aluminophosphate compositions disclosed in U.S. Pat. No. 4,310,440; 3) silicon substituted aluminophosphates as disclosed in U.S. Pat. No. 4,440,871 and 4) titanium substituted aluminophosphates as disclosed in U.S. Pat. No. 4,500,651.

Applicants have synthesized a new series of molecular sieves composed of germanium and at least one $M^{+m}$ framework element, where M includes metals such as niobium, gallium and tin and m is an integer from +2 to +5. Silicon and titanium also can be framework elements. The molecular sieve is represented by the empirical formula $$A_{[(4+4y(4-m))/n]}(Ge_{1-x}M_y^{+m}Ti_z^{+4})_4(Ge_{1-p}Si_p)_3O_{16}$$

where A is a cation such as alkali metals, alkaline metals and hydronium ions having a valence of +n, x varies from about 0.01 to about 1.0, y varies from 0 to about 1.0, x=y+z, z has a value of zero to about 1.0 and p varies from 0 to about 0.99. When z is zero, M is $Nb^{+5}$, $Ta^{+5}$, $Sb^{+5}$, or $Sn^{+4}$. These materials are characterized in that they have the crystal structure of pharmacosiderite.

Pharmacosiderite occurs in nature, has the formula $$KFe_4As_3O_{12}(OH)_4 \cdot 6-8H_2O$$

and has a cubic unit cell with an edge length of 7.91 Å. The structure consists of a three-dimensional network of eight-ring channels bounded by both octahedra $(FeO_6)^-$ and tetrahedra $(AsO_4)$. There are reports in the art of other materials having the structure of pharmacosiderite. For example, U.S. Pat. No. 3,329,481 discloses a titanium silicate designated TS-26 which has the structure of pharmacosiderite. U.S. Pat. No. 3,622,268 discloses a composition having the formula $$M_xH_{3-x}((Al_yFe_{1-y})_4(P_qAs_{1-q})_3O_{16}) \cdot zH_2O$$

and having the pharmacosiderite structure. Other references which disclose materials with the pharmacosiderite structure include: Acta Cryst., 12, 252 (1959); J. Chem. Soc. Chem. Commun., 1566 (1987); Zeolites, 10, 730–737 (1990); Chem. Mater., 4, 468–72 (1992).

None of the references discloses a metallogermaniumtitanate having a pharmacosiderite structure. There is also no hint from these references that such a composition with said structure could be synthesized.

SUMMARY OF THE INVENTION

This invention relates to a novel crystalline molecular sieve, a process for preparing the sieve and processes using the sieve. Accordingly, one embodiment of the invention is a crystalline molecular sieve having a chemical composition expressed by the empirical formula:

$$A_{[(4+4y(4-m))/n]}(Ge_{1-x}M_y^{+m}Ti_z^{+4})_4(Ge_{1-p}Si_p)_3O_{16}$$

where A is a cation having a valence of +n and selected from the group consisting of alkali metals, alkaline metals, hydronium ions and mixtures thereof, M is at least one metal which has octahedral coordination and has a valence m of +2, +3, +4 or +5, x has a value from about 0.01 to about 1.0, y has a value from 0 to about 1.0, x=y+z, z has a value of zero to about 1.0 and p has a value from 0 to about 0.99, except when z is zero, M is selected from the group consisting of $Nb^{+5}$, $Ta^{+5}$, $Sb^{+5}$, and $Sn^{+4}$, the composition characterized in that it has the crystal structure of pharmacosiderite.

Another embodiment of the invention is a process for preparing a crystalline molecular sieve having a chemical composition expressed by the empirical formula:

$$A_{[(4+4y(4-m))/n]}(Ge_{1-x}M_y^{+m}Ti_z^{+4})_4(Ge_{1-p}Si_p)_3O_{16}$$

where A is a cation having a valence of +n and selected from the group consisting of alkali metals, alkaline metals, hydronium ions and mixtures thereof, M is at least one metal which has octahedral coordination and has a valence of +2, +3, +4 or +5, x has a value from about 0.01 to about 1.0, y has a value from 0 to about 1.0, x=y+z, z has a value of zero to about 1.0 and p has a value from 0 to about 0.99, except when z is zero, M is selected from the group consisting of $Nb^{+5}$, $Ta^{+5}$, $Sb^{+5}$, or $Sn^{+4}$, the composition characterized that it has the crystal structure of pharmacosiderite, the process comprising reacting a mixture containing reactive sources of germanium, M, A and optionally silicon and titanium at a temperature and for a time sufficient to form the crystalline microporous composition, the mixture having a composition expressed in terms of mole ratios of the oxides of:

$$aA_2O:bM_2O:cGeO_2:dTiO_2:eSiO_2:fH_2O$$

where a has a value from about 0.5 to about 4, b has a value from about 0.05 to about 1.0, c has a value from about 0.5 to about 1.0, d has a value from zero to about 0.99, e has a value from zero to about 0.99 and f has a value from about 25 to about 200.

These and other objects and embodiments of the invention will become more apparent after a more detailed description of the invention.

DETAILED DESCRIPTION OF THE INVENTION

As stated, the instant invention relates to a crystalline molecular sieve and a process for preparing the sieve. The crystalline molecular sieves of the present invention have the empirical formula $$A_{[(4+4y(4-m))/n]}(Ge_{1-x}M_y^{+m}Ti_z^{+4})_4(Ge_{1-p}Si_p)_3O_{16}$$

where n is the valence of A and can be +1 or +2, x has a value from about 0.01 to about 1.0, y has a value from 0 to about 1.0, x=y+z, z has a value of zero to about 1.0 and p has a value of 0 to about 0.99. Further, A represents a cation selected from alkali metals, alkaline earth metals, hydronium ion and mixtures thereof. The alkali metals which can be used are lithium, sodium, potassium, rubidium and cesium. The alkaline earth metals include magnesium, calcium, strontium and barium. Finally, $M^{+m}$ is at least one metal which has octahedral coordination, i.e., can assume octahedral coordination, and has a valence m of +2, +3, +4 or +5. Examples of such metals are scandium, vanadium, niobium, hafnium, zirconium, chromium, manganese, iron, cobalt, nickel, copper, tin, gallium, antimony, tantalum, titanium (+3) and aluminum. Preferred M metals are niobium, antimony, tin, tantalum, iron and aluminum. When z is zero, M is selected from the group consisting of niobium (+5), tantalum (+5), antimony (+5) and tin (+4).

The molecular sieves of this invention are characterized in that they have the crystal structure of pharmacosiderite. As stated, pharmacosiderite has a cubic or distorted pseudocubic unit cell with both octahedral and tetrahedral framework sites. Germanium, titanium and the M metals will occupy the octahedral sites while germanium and optionally silicon will occupy the tetrahedral sites. As with other molecular sieves, the sieves of this invention have an intracrystalline pore system in which the pore openings are about 3.5 Angstroms. They also have the characteristic of reversibly adsorbing water while retaining their crystal structure, i.e., their essential framework topology.

The molecular sieves of this invention are prepared by hydrothermal crystallization of a reaction mixture prepared by combining reactive sources of the desired elements and water. Specific examples of the reactive sources of germanium are germanium oxide ($GeO_2$), germanium tetrachloride and germanium alkoxides, e.g., germanium ethoxide and germanium isopropoxide. Examples of A sources are potassium hydroxide, sodium hydroxide, cesium hydroxide, rubidium hydroxide, sodium carbonate, potassium carbonate, cesium carbonate and rubidium carbonate. Specific examples of M sources are niobium pentaoxide hydrate, stannic chloride, gallium trichloride, tantalum ethoxide, scandium chloride, vanadium oxide, zirconium tetrachloride, hafnium chloride, chromium chloride, manganese sesquioxide, ferric chloride, cobalt (III) chloride, nickel (III) chloride, antimony trichloride and alumina. Examples of sources of titanium are titanium trichloride, titanium tetrachloride, titanium tetraethoxide and amorphous titanium oxide. Finally, examples of reactive sources of silicon include sodium silicate, fumed silica, precipitated silica and silicon tetrachloride.

Generally, the hydrothermal process used to prepare the metallogermaniumtitanates of this invention involves forming a reaction mixture which is expressed by the formula in terms of mole ratios of the oxides of:

$$aA_2O:bM_2O:cGeO_2:dTiO_2:eSiO_2:fH_2O$$

where a has a value from about 0.5 to about 4, b has a value from about 0.05 to about 1.0, c has a value from about 0.5 to about 1.0, d has a value from zero to about 0.99, e has a value from zero to about 0.99 and f has a value from about 25 to about 200.

The pH of the mixture needs to be adjusted to a value of about 8 to about 14 and preferably from about 10 to about 12. The pH can be adjusted by adding an alkali hydroxide such as sodium hydroxide, potassium hydroxide or cesium hydroxide.

Having formed the reaction mixture, it is next reacted at a temperature of about 130° C. to about 225° C. for a period of time of about 4 to about 336 hours. The reaction is carried out under atmospheric pressure or the reaction vessel may be sealed and the reaction run at autogenous pressure. Preferably the reaction is run at a temperature of about 150° C. to about 200° C. and a time of about 24 to about 168 hours.

One function of the A metal is to act as a structure directing agent. Since the A metal acts as a structure directing agent, a portion of the A metal will be present in the pores of the molecular sieve. These A metals can be exchanged for other metals using well known ion exchange methods well known in the art.

The crystalline materials of this invention are capable of separating mixtures of molecular species based on the molecular size (kinetic diameters) or on the degree of polarity of the molecular species. When the separation of molecular species is based on molecular size, the crystalline microporous material is chosen in view of the dimensions of its pores such that at least the smallest molecular species of the mixture can enter the intracrystalline void space while at least the largest species is excluded. The kinetic diameters of various molecules such as oxygen, nitrogen, carbon dioxide, carbon monoxide are provided in D. W. Breck, ZEOLITE MOLECULAR SIEVES, John Wiley and Sons (1974), p. 636.

When the separation is based on degree of polarity, it is generally the case that the more hydrophilic crystalline material of this invention will preferentially adsorb the more polar molecular species of a mixture having different degrees of polarity even though both molecular species can communicate with the pore system of the crystalline material. For example water, which is more polar, will be preferentially adsorbed over common hydrocarbon molecules such as paraffins, olefins, etc. Thus, the crystalline materials of this invention can be used as desiccants in such adsorption separation/purification processes as natural gas drying, cracked gas drying, etc.

In order to more fully illustrate the instant invention, the following examples are set forth. It is to be understood that the examples are only by way of illustration and are not intended as an undue limitation on the broad scope of the invention as set forth in the appended claims.

EXAMPLE 1

Preparation of Cs-Ti-Ge-Sn-O

A solution was prepared by mixing 2.64 g of $GeO_2$ in 120.1 g of a 50 wt. % CsOH solution. A second solution was prepared by dissolving 8.8 g of $SnCl_4 \cdot 5H_2O$ in 27.9 g $H_2O$ and then adding 20% $TiCl_3$ in HCl. This second solution was added dropwise to the first solution with stirring. A solution of 50 wt. % CsOH was added to the mixture until the pH was 13.38. This gel had the composition $$3.44\ Cs_2O:0.1\ TiO_2:0.25\ GeO_2:0.25\ SnO_2:73.92\ H_2O$$

The gel was placed in a reactor and heated to 150° C. for 168 hours. After this time, the mixture was vacuum filtered, the solid was washed with distilled water and dried in air.

Scanning Electron Microscpy (SEM) of a portion of the sample including EDAX of a crystal indicated the presence of titanium, germanium and tin framework elements.

EXAMPLE 2

Preparation of K-Ti-Ge-O

A solution was prepared by mixing 11.3 g KOH in 90.4 g of water. To this solution there were added 11.2 g of $GeO_2$ and the mixture stirred. To this mixture there were added dropwise 2.9 g of $Ti(OC_3H_7)_4$. This reaction mixture had the empirical formula $$1.0\ K_2O: 0.1\ TiO_2: GeO_2: 50\ H_2O$$

The reaction mixture was reacted for 168 hours at 200° C. After reaction was complete, the solid was isolated by filtration, washed with water and then air dried. Elemental analysis showed that this material had the formula $$0.31\ K_2O: 0.24\ TiO_2: GeO_2: 0.92\ H_2O$$

X-ray diffraction analysis showed that this molecular sieve had the pharmacosiderite structure.

EXAMPLE 3

Preparation of K-Ti-Ge-O

A potassium hydroxide solution was prepared by mixing 4.5 g of KOH into 86.0 g water. This solution was used to dissolve 4.5 g $GeO_2$. Next, 30.9 g of 20% $TiCl_3$ in HCl was added dropwise with stirring. Finally, 19.1 g of a 50 wt. % KOH solution was added in order to adjust the pH to 10.7. The composition of the reaction mixture was $$2.13\ K_2O: 0.1\ TiO_2: 1.0\ GeO_2: 133.26\ H_2O$$

The reaction mixture was reacted for 72 hours at 200° C. After the reaction was complete, the solid was isolated by filtration, washed with water and dried in ambient air. Elemental analysis gave an empirical formula of $$0.42\ K_2O: 1.07\ TiO2: GeO_2: 1.47\ H_2O$$

X-ray diffraction showed that this molecular sieve had the pharmacosiderite structure. SEM/EDAX showed titanium and germanium were present as framework elements.

EXAMPLE 4

Preparation of Na-Nb-Ge-O

To 80.0 g of water there were added 42.6 g of $Na_2CO_3$. After the sodium carbonate was dissolved, 17.8 g of $GeO_2$ were added with stirring. To this mixture there was added a slurry of 3.9 g $Nb_2O_5$ in 100.3 g water. The pH of this solution was adjusted to 12.54 by adding 18.1 g of a 50 wt. % NaOH solution. The resultant mixture had a composition of $$0.57\ Na_2O: 2.0\ Na_2CO_3: 0.075\ Nb_2O_5: 0.85\ GeO_2: 52.51\ H_2O$$

This reaction mixture was reacted under autogeneous pressure for 120 hours at 200° C. When the reaction was complete, the solid was isolated by filtration, washed and dried in air at room temperature. Elemental analysis gave an empirical formula of $$0.44\ Na_2O: 0.17\ Nb_2O_5: GeO_2: 1.10\ H_2O$$

X-ray diffraction analysis showed that this composition had the pharmacosiderite structure. SEM/EDAX showed niobium and germanium were present as framework elements.

We claim as our invention:

1. A crystalline molecular sieve having a chemical composition expressed by the empirical formula:

$$A_{[(4+4y(4-m))/n]}(Ge_{1-x}M_y^{+m}Ti_z^{+4})_4(Ge_{1-p}Si_p)_3O_{16}$$

where A is a cation having a valence of +n and selected from the group consisting of alkali metals, alkaline metals, hydronium ions and mixtures thereof, M is at least one metal which has octahedral coordination and has a valence m of +2, +3, +4, or +5, x has a value from about 0.01 to about 1.0, y has a value from 0 to about 1.0, x=y+z, z has a value of zero to about 1.0 and p has a value from 0 to about 0.99, the composition characterized in that it has the crystal structure of pharmacosiderite and when z has a value of zero, M is selected from the group consisting of $Nb^{+5}$, $Ta^{+5}$, $Sb^{+5}$, or $Sn^{+4}$.

2. The composition of claim 1 where M is selected from the group consisting of scandium, vanadium, niobium, chromium, manganese, iron, cobalt, nickel, copper, tin, gallium, antimony, tantalum, hafnium, titanium (+3) and zirconium.

3. The composition of claim 2 where M is niobium, tin, antimony, aluminum, gallium and tantalum.

4. The composition of claim 1 where y is zero and p is zero.

5. A process for preparing a crystalline molecular sieve having a chemical composition expressed by the empirical formula:

$$A_{[(4+4y(4-m))/n]}(Ge_{1-x}M_y^{+m}Ti_z^{+4})_4(Ge_{1-p}Si_p)_3O_{16}$$

where A is a cation having a valence of +n and selected from the group consisting of alkali metals, alkaline metals, hydronium ions and mixtures thereof, M is at least one metal which has octahedral coordination and has a valence m of +2, +3, +4, or +5, x has a value from about 0.01 to about 1.0, y has a value from 0 to about 1.0, x=y+z, z has a value of zero to about 1.0 and p has a value from 0 to about 0.99, the composition characterized in that it has the crystal structure of pharmacosiderite, and when z has a value of zero, M is selected from the group consisting of $Nb^{+5}$, $Ta^{+5}$, $Sb^{+5}$, or $Sn^{+4}$; the process comprising reacting a mixture containing reactive sources of germanium, M, A and optionally silicon and titanium at a temperature and for a time sufficient to form the crystalline molecular sieve, the mixture having a composition expressed in terms of mole ratios of the oxides of:

$$aA_2O:bM_2O:cGeO_2:dTiO_2:eSiO_2:fH_2O$$

where a has a value from about 0.5 to about 4, b has a value from about 0.05 to about 1.0, c has a value from about 0.5 to about 1.0, d has a value from zero to about 0.99, e has a value from zero to about 0.99 and f has a value from about 25 to about 200.

6. The process of claim 5 where the temperature varies from about 130° C. to about 225° C. and the time varies from about 0.1 hour to about 5 days.

7. The process of claim 5 where the germanium source is selected from the group consisting of germanium oxide, germanium tetrachloride and germanium tetra-ethoxide.

8. The process of claim 5 where the titanium source is selected from the group consisting of titanium trichloride, titanium tetrachloride, titanium alkoxides and amorphous titania.

9. The process of claim 8 where the titanium alkoxide is titanium ethoxide or titanium isopropoxide.

10. The process of claim 5 where M is selected from the group consisting of scandium, vanadium, niobium, chromium, manganese, iron, cobalt, nickel, copper, tin, gallium, antimony, tantalum, hafnium, titanium and zirconium.

11. The process of claim 5 where the A source is selected from the group consisting of potassium hydroxide, cesium hydroxide, rubidium hydroxide, sodium hydroxide, potassium carbonate, sodium carbonate, cesium carbonate and rubidium carbonate.

* * * * *